(12) United States Patent
Obr et al.

(10) Patent No.: US 8,161,251 B2
(45) Date of Patent: Apr. 17, 2012

(54) HETEROGENEOUS STORAGE ARRAY OPTIMIZATION THROUGH EVICTION

(75) Inventors: Nathan Steven Obr, Bellevue, WA (US); Sompong Paul Olarig, Pleasanton, CA (US); Shiv Rajpal, Sammammish, WA (US)

(73) Assignee: Microsoft Corporation, Redmond, WA (US)

( * ) Notice: Subject to any disclaimer, the term of this patent is extended or adjusted under 35 U.S.C. 154(b) by 372 days.

(21) Appl. No.: 12/473,225

(22) Filed: May 27, 2009

(65) Prior Publication Data

US 2010/0306484 A1 Dec. 2, 2010

(51) Int. Cl.
*G06F 12/00* (2006.01)
*G06F 12/16* (2006.01)

(52) U.S. Cl. . 711/159; 711/161; 711/101; 711/E12.001; 711/E12.103; 711/E12.057

(58) Field of Classification Search .................. None
See application file for complete search history.

(56) References Cited

U.S. PATENT DOCUMENTS

| | | | |
|---|---|---|---|
| 5,875,457 A | 2/1999 | Shalit | |
| 6,038,680 A | 3/2000 | Olarig | |
| 6,154,853 A * | 11/2000 | Kedem | 714/6.22 |
| 6,467,022 B1 | 10/2002 | Buckland et al. | |
| 2002/0053009 A1 | 5/2002 | Selkirk et al. | |
| 2003/0135674 A1* | 7/2003 | Mason et al. | 710/74 |
| 2005/0188246 A1* | 8/2005 | Emberty et al. | 714/5 |
| 2005/0210304 A1 | 9/2005 | Hartung et al. | |
| 2008/0040540 A1 | 2/2008 | Cavallo | |
| 2008/0140921 A1 | 6/2008 | Sutardja et al. | |
| 2008/0222357 A1 | 9/2008 | Sutardja et al. | |

FOREIGN PATENT DOCUMENTS

WO 2008070173 A1 6/2008

OTHER PUBLICATIONS

Amiri Khaili S."Scalable and Manageable Storage Systems", Retrieved at<<www.stormingmedia.us/98/9812/A981284.pdf>>, Dec. 2000, pp. 261.

Stallmo David, "The Case for Software RAID", Retrieved at<<http://www.infostor.com/index/articles/display/56618/s-articles/s-infostor/s-volume-3/s-issue-4/s-opinion/s-the-case-for-software-raid.html>>, pp. 2.

Bitar, et al."Deploying Hybrid Storage Pools", Retrieved at<<wikis.sun.com/download/attachments/44401012/820-5881.pdf?version=1>>, Revision 1.0, Oct. 31, 2008, pp. 15.

Matthews, et al."Intel R Turbo Memory: Nonvolatile Disk Caches in the Storage Hierarchy of Mainstream Computer Systems", Retrieved at<<http://portal.acm.org/citation.cfm?doid=1367829.1367830>>, ACM Transactions on Storage, vol. 4, No. 2, Article 4, Publication date: May 2008, pp. 24.

* cited by examiner

*Primary Examiner* — Hoai V Ho
*Assistant Examiner* — James G Norman

(57) ABSTRACT

A storage system can comprise storage devices having storage media with differing characteristics. An eviction handler can receive information regarding the state of storage media or of data stored thereon, as well as information regarding application or operating system usage, or expected usage, of data, or information regarding policy, including user-selected policy. Such information can be utilized by the eviction handler to optimize the use of the storage system by evicting data from storage media, including evicting data in order to perform maintenance on, or replace, such storage media, and evicting data to make room for other data, such as data copied to such storage media to facilitate pre-fetching or implement policy. The eviction handler can be implemented by any one or more of processes executing on a computing device, control circuitry of any one or more of the storage devices, or intermediate storage-centric devices.

20 Claims, 5 Drawing Sheets

HETEROGENEOUS STORAGE ARRAY OPTIMIZATION THROUGH EVICTION

BACKGROUND

Modern storage media includes not only media that store data in a physically sequential manner, such as traditional magnetic and optical storage media, but also media that store data in a physically random manner, such as solid-state based storage media. Such physically random media allow any one block of data to be accessed as efficiently as any other block of data. These, and other, physical differences between the various storage media commonly available today result in storage media that differ in capability, attributes and performance. For example, magnetic and optical media require a reading and writing apparatus that physically moves from the physical location of the device head to the physical location of a block. Consequently, the speed with which such storage media can read or write data is dependent upon the proximity of the locations of the data on the media, since the device head must physically transition from one location to the other. Conversely, solid-state based storage media can read and write data through electrical signals without requiring any physically moving parts. As a result, the data stored on such media can be written, or read, with efficiency that is not dependent upon the particular location of the data on, for example, rotating media.

From the perspective of a user of such storage media, magnetic and optical storage media that store data in a sequential manner are generally regarded as having specific capability, attribute and performance advantages and disadvantages with respect to solid-state based storage media. For example, magnetic media is generally regarded as having a greater density per unit of area than solid state media. As a result, magnetic media can store between three to five times more information than solid-state media within a given physical area. Similarly, magnetic storage media are generally regarded as being able to write a large amount of data in a sequential manner faster than solid-state based storage media, again due to the sequential nature of magnetic storage media. By contrast solid-state based storage media are generally regarded as being able to read and write small amounts of randomly addressed data, in a substantially faster manner than magnetic or optical storage media.

Among attribute differences, solid-state based storage media are generally regarded as being quieter than magnetic-based storage media, since, as indicated previously, solid-state media can comprise no moving parts. Solid-state based media are also generally regarded as being more power efficient and consuming less power than magnetic-based storage media.

One capability difference between solid-state based storage media and magnetic and optical storage media that can have a substantial impact on the user of such storage media is the reliability of such storage media. Traditional magnetic media is generally considered to have a substantial usage period between failures. From the user's perspective, such media can be written repeatedly without special consideration being paid to wear or data loss, except, of course, in statistically rare mechanical failures. Solid-state based storage media, on the other hand, are generally considered to have a limited number of writes before their physical nature can result in data loss at an individual bit level. Techniques such as "wear leveling" can be utilized to prevent prematurely excessive utilization of portions of such solid-state based storage media, but such wear leveling techniques can have a performance impact.

Modern storage devices including both sequential based storage media devices, and solid-state based storage media devices, traditionally comprise, in addition to the storage media itself, one or more capable controllers, which are designed to manage the data stored on the storage media itself. These controllers can perform management tasks that are internal to the storage device itself, such as, for example, compaction, encryption and wear leveling.

SUMMARY

Application programs and operating systems can provide indicators regarding expected utilization of data, such as requests to pre-fetch data that is expected to be utilized soon, or indications that specific data is important and is expected to be retained for an extended period of time. Applications programs and operating systems can also provide policy information, including policy information that can be set by the user, or informed by user settings, such as power consumption policies and noise level policies. Operating system components, device drivers and storage device controllers can provide media status information, including the level of fragmentation of data stored on the media, the need for the media to be wear leveled, and the presence of errors or other conditions that may presage a failure of the media.

In one embodiment, indicators, policy information, media status and other like information can be utilized to initiate an eviction of specific data from a specific storage medium to another storage medium. The eviction decision can be informed by an aggregate view of the storage system, comprising multiple storage devices, such that the eviction is from the storage media of one device of the storage system to the storage media of another, different, device of the storage system.

In another embodiment, the eviction of data from a storage medium can provide sufficient storage capacity on that medium for new data that can be pre-fetched to that medium for faster subsequent access.

In a further embodiment, storage devices can be queried for specific abilities, such as the ability to perform an eviction. If a storage device cannot perform eviction, existing mechanisms, such as a Direct Memory Access (DMA) engine, can be utilized to perform the actual copying of data.

In a still further embodiment, the eviction of data from a storage medium can enable repair or maintenance tasks to be accomplished with respect to that storage medium. Such tasks can include wear leveling, partitioning, defragmentation, or even wholesale physical replacement of the medium or of a storage device comprising such a medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
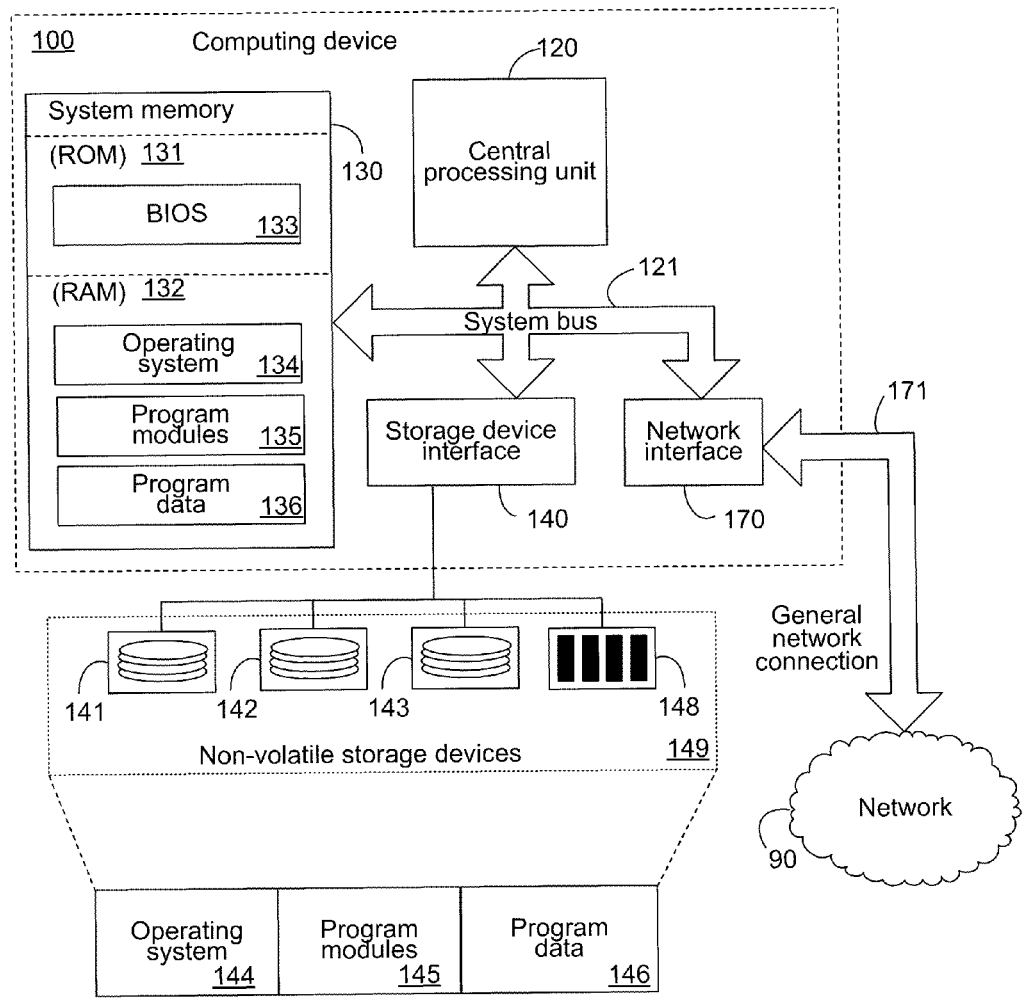
FIG. 1 is a block diagram of an exemplary computing device.

The following description relates to the optimization of a heterogeneous storage array, comprising multiple storage devices of differing types of storage media, through the use of eviction. Data stored on one storage medium of one storage device can be evicted to a different storage medium of a different storage device to improve either, or both, of the reliability or performance of the heterogeneous storage array, in accordance with metrics relevant to a given user. Indicators and policy information from application programs, or the operating system, can be utilized to inform decisions to trigger an eviction, as can media status information received from storage devices or like sources. The eviction of data can enable media maintenance, replacement, or utilization for another task, such as storing pre-fetched data so that it is available more efficiently at a subsequent time.

The techniques described herein focus on, but are not limited to, solid-state based storage devices and magnetic based storage devices. To the contrary, the mechanisms described below are equally applicable to any type of storage media and any type of storage mechanism, so long as different types of storage media, having different advantages and disadvantages, comprise a single storage system that can be accessed by the described mechanisms. Thus, references below to solid-state based storage devices and magnetic based storage devices are meant to be exemplary only, specifically as examples of storage media having differing advantages and disadvantages, and are not meant to limit the below descriptions to specific storage mechanisms or specific storage hardware.

Although not required, the descriptions below will be in the general context of computer-executable instructions, such as program modules, being executed by one or more computing devices. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary computing device 100 is illustrated, which can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus or point-to-point architectures.

The computing device 100 also typically includes computer readable media, which can include any available media that can be accessed by computing device 100, either by obtaining data from, or providing data to, such computer readable media, and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 1 illustrates an operating system 134, other program modules 135, and program data 136.

The computing device 100 may also include other removable/non-removable, volatile/nonvolatile computer storage media. FIG. 1 illustrates one or more non-volatile storage devices 149, each containing non-volatile storage media, connected to the computing device 100 via a storage device interface 140 that is, in turn, connected to the system bus 121. By way of example only, the one or more non-volatile storage devices 149 include hard disk drives 141, 142 and 143, which can utilize magnetic based storage media, and a flash drive 148 that can utilize solid-state based storage media, including storage media based on single-level cell (SLC) or multi-level cell (MLC) based solid-state technology. Other removable/non-removable, volatile/nonvolatile computer storage media and storage devices that can be used with the exemplary computing device include, but are not limited to, FLASH memory cards, or other solid-state storage devices, including RAM disks, hard drives, magnetic tape cassettes, digital versatile disks, digital video tape and other sequential storage devices.

The drives 141, 142, 143 and 148, and their associated computer storage media discussed above and illustrated in FIG. 1, provide storage of computer readable instructions, data structures, program modules and other data for the computing device 100. In FIG. 1, for example, the storage devices 149 are illustrated as storing an operating system 144, other program modules 145, and program data 146. Note that these components can either be the same as or different from operating system 134, other program modules 135 and program data 136. Operating system 144, other program modules 145 and program data 146 are given different numbers here to illustrate that, at a minimum, they are different copies.

Additionally, the computing device 100 may operate in a networked environment using logical connections to one or more remote computers. For simplicity of illustration, the computing device 100 is shown in FIG. 1 to be connected to a network 90 that is not limited to any particular network or networking protocols. The logical connection depicted in FIG. 1 is a general network connection 171 that can be a local area network (LAN), a wide area network (WAN) or other network. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Figure 2:
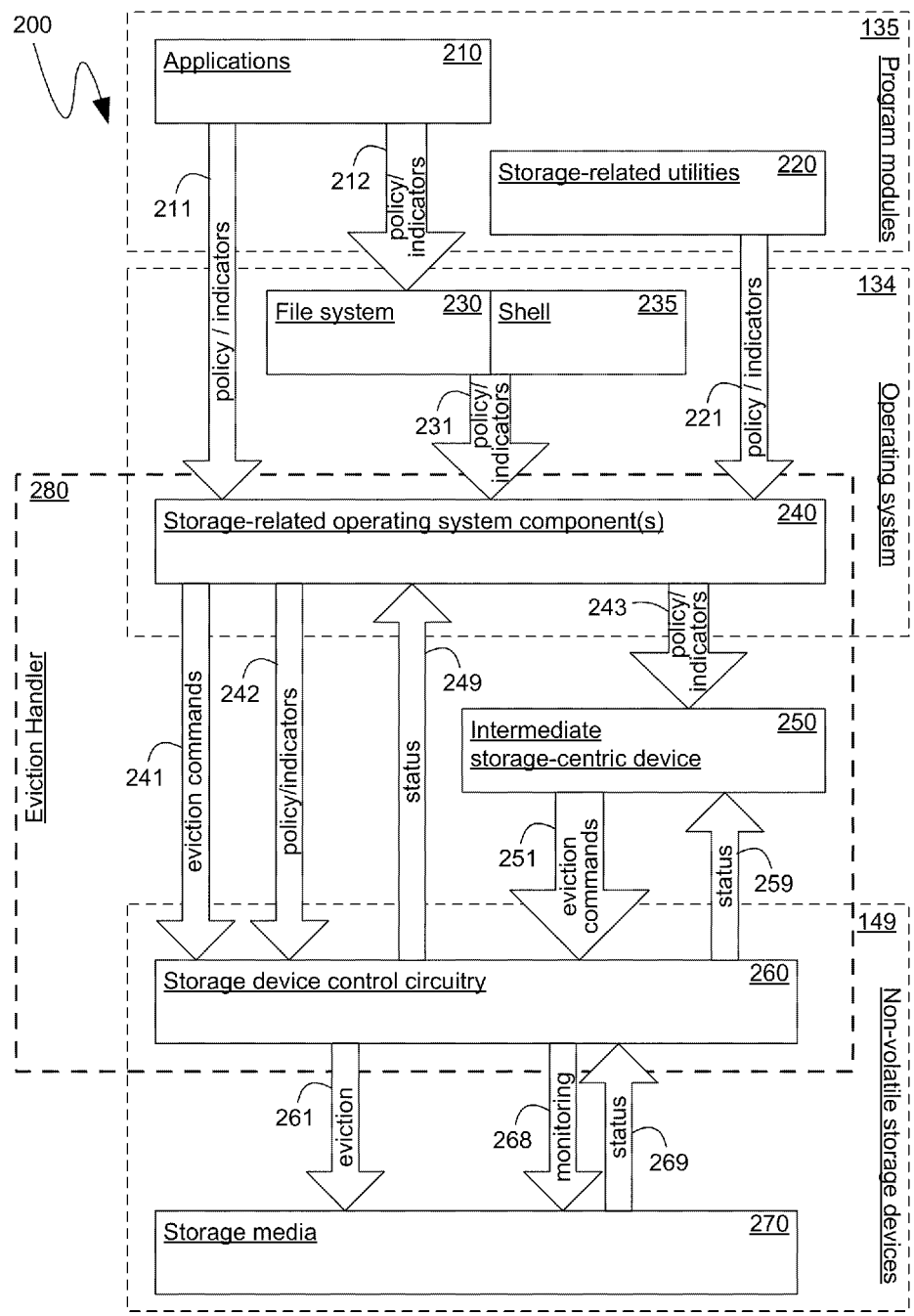
FIG. 2 is a layer block diagram of an exemplary series of alternative communications and objects.

Turning to FIG. 2, more specific components or elements of the generic program modules 135 and operating system 134 of FIG. 1 are shown in the layer system 200. In particular, as shown, the generic program modules 135 of FIG. 1 can include one or more application programs, such as the applications 210, and one or more storage-related utilities 220. As will be known by those skilled in the art, both the applications 210 and the utilities 220 can be comprised of computer-executable instructions that can be executed by the exemplary computing device 100 to perform various functions and tasks. Similarly, the omnibus operating system 134 of FIG. 1 can comprise computer-executable instructions directed to the implementation of, and the maintenance of, a file system 230 and computer-executable instructions directed to the implementation of an operating system shell user interface 235. The operating system 134 can further comprise one or more storage-related operating system components 240, which can comprise computer-executable instructions directed to the performance of storage-related tasks or otherwise directed to the utilization or control of the one or more storage devices 149 communicationally coupled to the computing device 100.

The storage devices 149 were illustrated in FIG. 1 as exemplarily comprising physical hard disk drives 141, 142 and 143, and a physical solid-state drive 148. As will be known by those skilled in the art, each of such drives 141, 142, 143 and 148, and any other drives that can be part of the one or more storage devices 149, can comprise control circuitry 260 for controlling physical aspects of the drive, and can further comprise the storage media 270 on which the data is actually stored. Consequently, in the layered system 200 of FIG. 2, the storage devices 149 are shown as comprising one or more storage device control circuitry, such as the storage device control circuitry 260, and one or more storage media, such as the storage media 270. For purposes of the illustration provided in FIG. 2, the storage media 270 can be any of the above described storage media, including magnetic based storage media, solid-state based storage media, or any other storage media.

The one or more storage devices 149, shown in FIG. 1 as being communicationally coupled to the computing device 100 via a storage device interface 140, can, in one embodiment, be only indirectly communicationally coupled to the computing device 100. Instead, as shown in FIG. 2, the one or more storage devices 149 can be communicationally coupled to an intermediate storage-centric device 250, and the intermediate storage-centric device 250 can, then, be communicationally coupled to the computing device 100 via the storage device interface 140. Such an intermediate storage-centric device 250 can include interface or protocol adapters or translators designed to enable communications between storage devices having one type of interface and a computing device having another type of interface. Such an intermediate storage-centric device 250 can also include devices designed to amalgamate multiple devices, such as a combination of the hard disk drives 141, 142 and 143, and the solid-state drive 148, into a single storage unit, such as a Redundant Array of Inexpensive Disks (RAID) device or a Just a Bunch Of Disks (JBOD) device.

In one embodiment, the applications 210 can provide indicators or policy information that can either be determined by the applications 210 themselves, or can be based on user input. For example, a media application, such as a video player or audio player application, can provide indicators of the next data that will be required by the application, such as, for example, the next song in a playlist. Alternatively, applications such as, for example, a digital image editing application, can enable the user to specify a required level of performance, or specify levels of interrelated factors, such as performance and battery life of a mobile computing device on which such an application may be executed.

Policy data and other indicators generated by the applications 210 can be provided to the operating system 134. As shown in the system 200 of FIG. 2, in one embodiment, the applications 210 can provide such information directly to storage-related operating system components 240, such as via communication 211. Alternatively, as illustrated by communication 212 in the system 200 of FIG. 2, the applications 210 can provide policy or indicator information to the operating system shell 235. For example, a user using one of the applications 210 can set a property on a file being utilized by that application to indicate that the file is of a high importance. Such an indicator can be communicated, via communication 212, to enable the operating system shell 235 to, for example, shade the visual representation of the file with a different color.

Like the applications 210, components of the operating system 134, such as the file system 230 can, themselves generate various indicators of relevance to mechanisms described below, or they can provide policy indicators of various policy decisions that may have been made, such as by the user. For example, the file system 230 and the operating system shell 235 can enable a user to specify specific levels of performance or specific balances between performance and countervailing criteria, such as power consumption or noise levels. Similarly, the file system 230 and the operating system shell 235 can enable the user to mark specific files as important or as temporary and, consequently, not required to be saved for more than a very short period of time. Such policy information and indicators such as file usage indicators, whether obtained from the applications 210, from settings established by the user, or generated by components of the operating system 134, can be provided, such as via communication 231, to the storage-related operating system components 240.

Among the program modules 135 can also be storage-related utilities 220 that can communicate, at least in part, directly with the storage-related operating system components 240. Such storage utilities 220 can include, for example, utilities designed to optimize storage-related functions and actions, or to provide greater user control of storage-related matters, including, for example, protecting against, or recovering, from storage-related errors, such as disk failures. The user can utilize the storage-related utilities 220 to inform various storage-related policies and the storage-related utilities themselves can further generate indicators or other policy decisions. For example, based on their own analysis, the storage-related utilities 220 can identify data that can be pre-fetched to provide a more responsive user experience. Similarly, again based on their own analysis, the storage-related utilities 220 can identify portions of various storage media that may be more susceptible to failure, such as portions exhibiting an unusually large number of improperly operating storage blocks. Such indicators and policy decisions can be provided to the storage-related operating system components 240 by communication 221, as illustrated in the system 200 of FIG. 2.

In one embodiment, the storage-related operating system components 240 of the operating system 134 can comprise traditional storage-related operating system components, such as, for example, device drivers and other components responsible for communicating with the storage devices 149. In such an embodiment, policy information, indicators and other such information received by the storage-related operating system components 240, such as via communications 211, 231, and 221 can be passed, by the storage-related operating system components to either the storage device control circuitry 260 of the storage devices 149, as shown by communication 242 of the system 200, or to intermediate storage-centric devices, such as the intermediate storage-centric device 250, as shown by communication 243.

In another embodiment, however, the storage-related operating system components 240 of the operating system 134 can further comprise components directed to the determination, and initiation, of one or more evictions of data from one or more storage media 270 of the storage devices 149. More specifically, as will be described further below, computer-executable instructions that are part of the storage-related operating system components 240 can, in this embodiment, utilize the policy, indicators and other information received through communications 211, 221 and 231, as well as any information generated internally by the storage-related operating system components themselves, to identify reasons to trigger an eviction of some data from one or more storage media. In such an embodiment, rather than providing the policy and indicators to further downstream elements, the storage-related operating system components 240 can, instead, issue eviction commands, such as those in the communication 241, to the storage device control circuitry 260 of one or more of the storage devices 149 that comprise the storage media 270 from which the eviction is to occur.

Returning to the previously described embodiment, if the storage-related operating system components 240 merely passed policy, indicators and other information received from upstream components, or generated internally, such as indicated by communications 242 or 243, then the eviction determinations, indicated above, that can be made based on that information can, instead, be made by, in one embodiment, the intermediate storage-centric device 250, or, in another embodiment, by the storage device control circuitry 260 of one or more of the storage devices 149. More specifically, as shown in the system 200 of FIG. 2, in one embodiment, the storage-related operating system components 240 can provide policy, indicators, or other like information to the intermediate storage-centric device 250 via communication 243. The intermediate storage-centric device 250 can then generate eviction commands based on the received information, such as will be described further below, and provide those generated eviction commands to the storage devices 149, such as via communication 251. In an alternative embodiment, the storage-related operating system components 240 can provide policy, indicators, or other like information, not to the intermediate storage-centric device 250, but rather directly to the storage devices 149, such as via communication 242. In such an embodiment, the storage device control circuitry 260 of those storage devices 149 that receive the communication 242 can, like the storage-related operating system components 240, or the intermediate storage-centric device 250 in the embodiments previously described, generate eviction determinations and perform an eviction of data from one or more storage media 270.

Whether the eviction of data is performed in response to eviction commands 241 received by the storage device control circuitry 260 from the storage-related operating system components 240, eviction commands 251 received by the storage device control circuitry from an intermediate storage-centric device 250, or is performed in response to determinations internal to the storage device control circuitry, the physical copying of the data from the one or more storage media 270 from which such data is being evicted can occur under the control of the storage device control circuitry through the use of specific commands generally illustrated in FIG. 2 by the eviction control instructions 261. As will be known by those skilled in the art, the eviction control instructions 261 can be more detailed and implement substantially more control of the underlying media 270 than can the more general eviction commands 241 or 251 issued to the storage device control circuitry 260 by other processes or devices.

In addition to performing an eviction of data from one or more storage media 270 of the storage devices 149, the control circuitry 260 of those storage devices can also monitor the storage media for possible indications of failure, or other relevant data, such as the efficient utilization of the media, the alignment between Input/Output (I/O) access patterns and the physical media or the fragmentation of data stored thereon. Thus, as shown in the system 200, monitoring 268 can be performed by the storage device control circuitry 260 and, in response to such monitoring the storage device control circuitry can receive various status information 269 from the monitored storage media 270. Such status information 269 can be utilized to initiate, or otherwise determine the need for, an eviction of data. Consequently, in various embodiments, such status can be provided to components or devices that can make such determinations, including, for example, the storage-related operating system components 240, via communication 249, or the intermediate storage-centric device 250, via communication 259.

As can be seen, the determination of when to perform an eviction of data from one or more of the storage media 270, as well as other associated determinations, can be made by processes executing on the computing device 100, such as, for example, the storage-related operating system components 240, or such determinations can be made by the storage devices 149 themselves, such as, for example, by the storage device control circuitry 260, or they can be made by a storage-centric device intermediate between the computing device and the storage devices, such as, for example, the intermediate storage-centric device 250. Consequently, the eviction handler 280, which will be described in more detail below, is shown in FIG. 2 to include a combination of any one or more of the afore-mentioned storage-related operating system components 240, intermediate storage-centric device 250, and the storage device control circuitry 260. As used in the description below, therefore, the term "eviction handler" means any component, device, or combination of components and/or devices, that initiates or otherwise determines that an eviction of data from one or more of the storage media 270 is to be performed.

Figure 3:
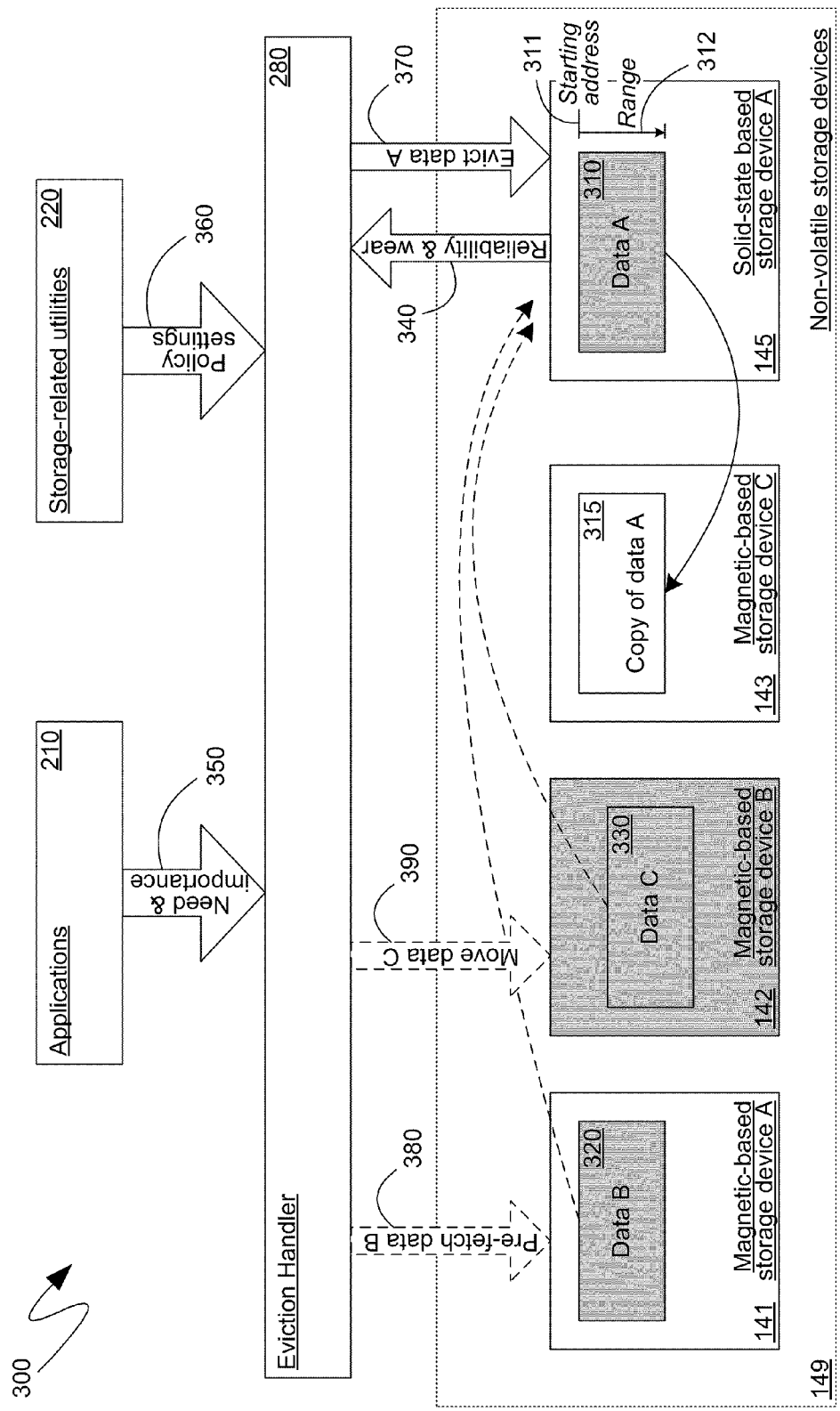
FIG. 3 is a block diagram of an exemplary eviction of data.

Turning to FIG. 3, the operation of the eviction handler 280 is described in greater detail with respect to the system 300. As shown in FIG. 3, the system 300 comprises the applications 210, the storage-related utilities 220, the storage devices 149, and the eviction handler 280, which, as indicated previously, can include one or more components or elements from among the computing device 100, the storage devices 149, and any intermediate storage-centric devices 250. The eviction handler 280 can receive, as indicated previously, input that can be utilized to determine whether to initiate an eviction of data from one or more of the storage media of the storage devices 149. One such set of input, as shown in the system 300, that the eviction handler 280 can receive can be information 350 from the applications 210 that can provide information about data being used or generated by those applications. For example, information 350 can specify a range of data that one of the applications 210 expects to access repeatedly while it is executing. Or, as another example, information 350 can specify the importance of certain data, such as, for example, specifying that a specific set of data was temporary data that is no longer needed. Another set of input that the eviction handler 280 can receive can be provided by storage-related utilities 220 that can, as also shown in the system 300, provide information 360 that can include policy settings, such as a user-expressed preference to, for example, favor power consumption over performance. Yet another set of input that the eviction handler 280 can receive to determine whether an eviction of data is to be performed can be received from the storage devices 149, such as part of the status 269 received by monitoring 268 the storage media 270. Thus, as shown in the system 300, information 340, which can include reliability and wear information, as well as information regarding the fragmentation state, or other state, of the data stored on the storage media, the efficiency of the media utilization, data alignment within the physical media, and the state of the media itself, can be provided to the eviction handler 280.

Based on the information 340, 350 and 360 received, the eviction handler 280 can determine to evict specific data from one or more storage media on one or more of the storage devices to media on other storage devices. Thus, as shown in the system 300, the eviction handler 280 can determine to evict data 310 from the solid-state based storage device 145 to the magnetic-based storage device 143 by issuing an eviction command 370 that can, in one embodiment, specify the data 310 to be evicted through its starting address 311 and a range 312 extending from that starting address. The data 310 can then be copied from the solid-state based storage device 145 to the magnetic-based storage device 143 as the copy of the data 315. The data 310 can then be removed from the media of the solid-state based storage device 145, such as, for example, by marking the data 310 as free space. The data 310 is shown in FIG. 3 with shading to illustrate that, in one embodiment, eviction of the data 310 comprises its removal from the media of the solid-state based storage device 145 after being copied to the magnetic-based storage device 143 as data 315.

For example, if the eviction handler 280 receives information 340 indicating that the media of the solid-state based storage device 145 needs to be wear leveled, it can evict all of the data stored on such media to, for example, the magnetic-based storage device 143 as shown. In such an example, the evicted data 310 can be all of the data stored on the solid-state based storage device 145. After the data 310 is evicted, wear leveling of the solid-state based storage device 145 can proceed and, once the solid-state based storage device has been wear leveled, the eviction handler 280 can, optionally, decide to return the data to the solid-state based storage device.

Alternatively, the eviction handler 280 can receive information 340 that the solid-state based storage device 145 is failing. In such a case, the eviction handler 280 can issue a command 370 to evict all of the data 310 from the solid-state based storage device 145 to, for example, the magnetic-based storage device 143. Subsequently, the solid-state based storage device 145 can be replaced with a new solid-state based storage device and the copy of the data 315 can be returned to the new solid-state based storage device.

The eviction of data from a storage device, such as the solid-state based storage device 145, need not comprise all of the data stored on such a storage device. For example, if the eviction handler 280 receives information 340 that a portion of the data on a storage device, such as the solid-state based storage device 145, is excessively fragmented, the eviction handler can issue a command 370 to evict only the excessively fragmented data 310 to another storage device, such as the magnetic-based storage device 143. In such an example, the eviction of the excessively fragmented data 310 to the storage device 143 as data 315 can enable the defragmentation of the data to occur on a storage device, such as the magnetic-based storage device 143, on which such defragmentation can be more efficiently performed or on which such defragmentation can be performed without unnecessary wear of the underlying storage media. Alternatively, the excessively fragmented data 310 could be copied in such a manner that the data 315 on the destination is already defragmented. In such an example, however, the specified starting address 311 and the specified range 312 of the data 310 to be evicted would identify only a portion of the data stored on the storage medium 145 from which such an eviction was occurring.

In one embodiment, the eviction handler 280 can aid storage devices in the alignment of data as stored on the storage medium of the storage device. For example, storage media can store data in particular sized quanta and, for optimization, the operating system 134 can perform storage transactions utilizing an equivalently sized grouping of data. However, the mere equivalence of size may not be sufficient, as the data may not be aligned with the underlying media's divisions. In such a case, data aggregated by the operating system 134 to correspond to a single division of the underlying storage media may, in fact, still span at least two such divisions due to the misalignment. Information regarding such misalignment can be provided to the eviction handler 280 as part of the information 340 and, in response, the eviction handler 280 can evict data 310 comprising at least some of the misaligned data such that the resulting evicted copy of the data 315 comprises aligned data.

Similarly, as will be known by those skilled in the art, some storage media, such as solid-state based storage media, can only perform certain actions, such as erasing, on a block-by-block basis. In such storage media, if data smaller than a block is marked to be deleted, such data can only be deleted by reading data of the entire block into temporary storage, deleting all of the data of the block, and then writing back only the data from the block that was not marked for deletion. Consequently, if a sufficient number of blocks have portions of data that is marked for deletion, in one embodiment, such information can be provided to the eviction handler 280 as part of the information 340. In response, the eviction handler 280 can evict data 310 comprising at least some of those blocks such that the resulting evicted copy of the data 315 comprises only the data that was not marked for deletion. The blocks of the data 310 on the original storage medium can then be erased without loss of performance of the overall storage media 149.

In other embodiments, the eviction handler 280 can receive information from, and base eviction decisions on, sources other than those associated with the underlying storage media. For example, the eviction handler 280 can receive information 350 from one or more of the applications 210 that can indicate how the applications 210 intend to use data, which data they intend to use, what their perceived importance is of such data, or other like information. For example, the information 350 can specify a set of data 320 that can represent database records related to a database record currently being utilized by one of the applications 210. In such a case, the eviction handler 280 can determine that such data 320 can be made more efficiently accessible, should it be accessed by one of the application programs 210, by storing it on a storage media that can provide faster reading of data, especially small quantities of randomly stored data, than the magnetic media on which the data 320 is currently stored. To provide sufficient storage space on, for example, the solid-state based storage device 145, which can comprise such faster access media, the eviction handler 280 can evict data 310 from the solid-state based storage device, such as by issuing the eviction command 370 to evict the data 310 to the magnetic-based storage device 143. Subsequently, the eviction handler 280 can issue a pre-fetch command 380 to copy the data 320 from the magnetic-based storage device 141 to the solid-state based storage device 145. Subsequently, the data 320 that is stored on the storage device 141 can be marked for deletion, since such data will, instead, in the future be read from, and written to, the storage device 145. As before, therefore, the data 320 is shaded in FIG. 3 to indicate that, after it has been evicted to the storage device 145, it is marked for deletion.

In a similar manner, the eviction handler 280 can evict data from one storage medium to another storage medium of a different storage device in order to satisfy various policies. For example, if the eviction handler 280 received information 360 indicating that the user preferred energy efficiency over performance, the eviction handler could determine to copy some data, such as the data 330, to a storage medium associated with a lower power consuming storage device and, subsequently, deactivate the storage device 142 on which the data 330 was presently stored. Such a decision could result in reduced performance, such as, for example, if data other than the data 330 was required from the storage device 142, but the aggregate data stored on the storage device 142 may be greater than the storage capacity of a lower power storage device, such as the storage device 145 and, consequently, the eviction handler 280 could determine to only move some of the data, such as, for example, the data 330. Thus, as shown in the system 300, the eviction handler 280 could issue an eviction command 370 to evict the data 310 from a lower power storage device, such as the solid-state based storage device 145 to make room for data 330 that may be more immediately useful. Subsequently, the eviction handler 380 could issue a command 390 to move the data 330 from a higher power storage device, such as the magnetic-based storage device 142, to the solid-state based storage device 145. The eviction handler 280 could then cause the magnetic-based storage device 142 to spin down or otherwise enter a power conserving state, thereby reducing the energy consumption of the overall storage system. Because the storage device 142 can, in the present example, be placed in a power conserving state after the data 330 has been evicted from it to another storage device, the storage device 142 is shaded in FIG. 3.

Other policies that can be specified by, for example, the information 360, can be policies specifically related to eviction. For example, the user, or other processes, can request that the eviction handler 280 not perform eviction if the processing load on, for example, the computing device 100, exceeds a predetermined threshold. Alternatively, a policy can specify that the eviction handler 280 can be limited to performing evictions during off-peak hours, such as in the middle of the night. Such policies can be especially useful for evictions utilized to enable routine maintenance, such as wear leveling or defragmentation, which can be scheduled in a flexible manner.

As can be seen, data, such as data 310, can be evicted to enable maintenance or similar tasks with respect to the storage media of the device, such as the solid-state based storage device 145, or it can be evicted to provide greater ability to store other data. Because the transfer of data to the device from which data is being evicted is optional, such operations, and associated communications, are illustrated via dashed lines in FIG. 3.

In one embodiment, if the data 310 to be evicted has been indicated as being temporary or otherwise no longer needed, such as through information 350, rather than evicting the data to another storage device, such as the magnetic-based storage device 143, the eviction handler 280 can instruct the storage device on which such data is stored, such as the solid-state based storage device 145, to simply discard the data. Thus, within the context of the system 300, the copying of the data 315 can be forgone if the data 310 can be merely discarded, such as if it is no longer needed or was otherwise temporary data.

Figure 4:
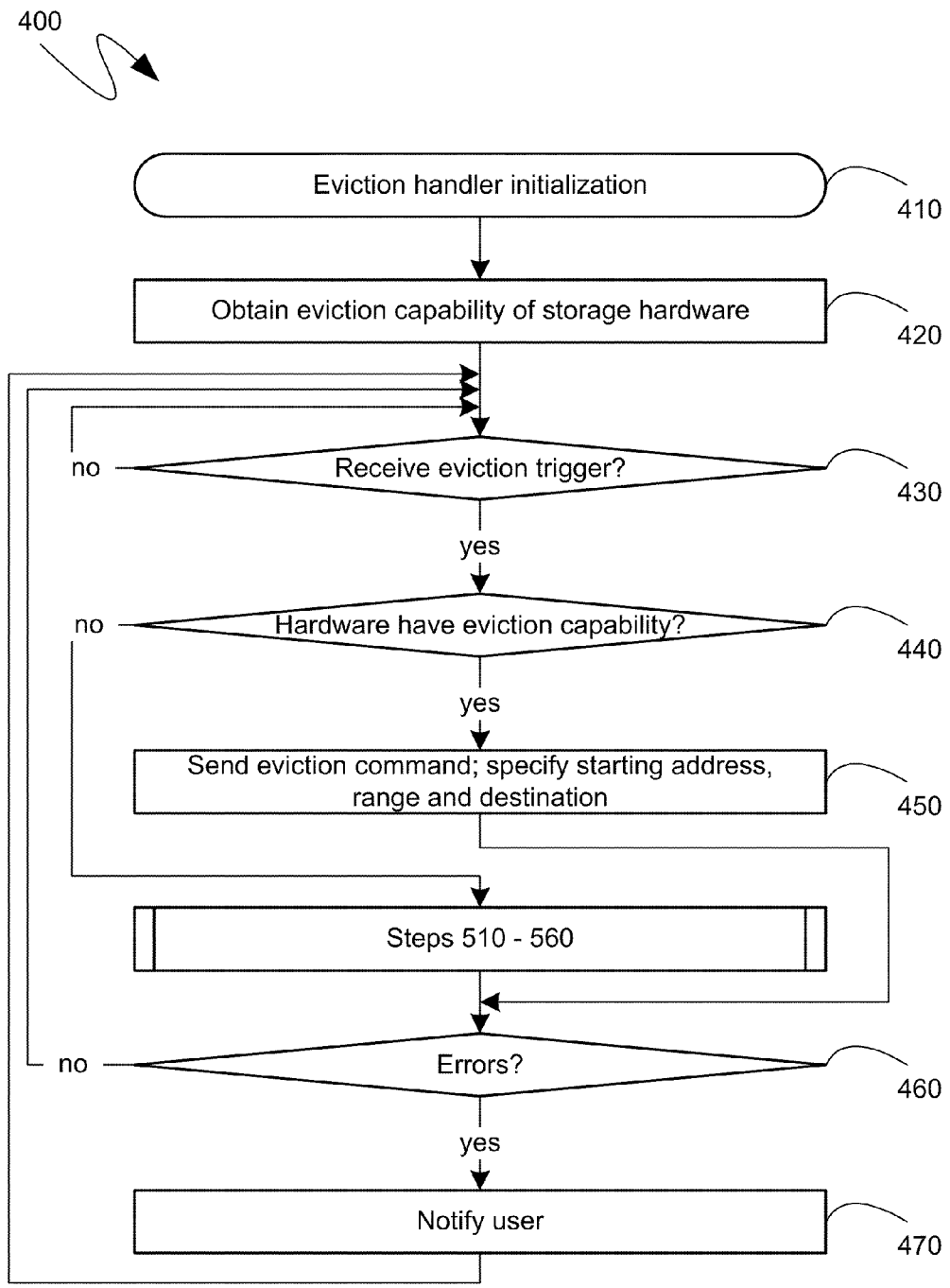
FIG. 4 is a flow diagram of an exemplary operation of an eviction handler.

Turning to FIG. 4, the operation of the eviction handler 280 is further illustrated and described with reference to the flow diagram 400. As can be seen, initially, at step 410, the eviction handler 280 can be initialized. Such an initialization can be in conjunction with a powering on or resetting of the computing device 100, such as, for example, if some or all of the eviction handler 280 is implemented, at least in part, in the operating system 134, or other process executing on the computing device. Alternatively, the initialization of step 410 can be part of a powering on of a storage device, such as, for example, if the eviction handler 280 is implemented, at least in part, in the storage device control circuitry 260 of one or more of the storage devices 149, or if the eviction handler is implemented, at least in part, by an intermediate storage-centric device 250.

Subsequently, at step 420, after the eviction handler 280 has been initialized at step 410, it can determine whether the available storage hardware has any eviction capability. As will be recognized by those skilled in the art, to the extent that additional storage hardware is added after the initialization of step 410, the eviction handler 280 can reference such storage hardware's eviction capability at the time that such hardware is communicationally coupled to the computing device 100.

In one embodiment, the information regarding the storage hardware's eviction capability obtained at step 420 can enable the eviction handler 280 to determine whether it can perform evictions from the queried storage devices through higher-level commands, such as commands that merely specify the data to be evicted and its destination, or whether the eviction handler may need to be more involved in the eviction, such as by providing more detailed commands and parsing errors and other feedback.

As indicated previously, the eviction handler 280 can comprise computer-executable instructions executing as part of the operating system 134, storage device control circuitry 260 that can be part of some or all of the non-volatile storage devices 149, or one or more intermediate storage-centric devices 250. Consequently, the exact mechanism by which the eviction handler 280 performs step 420 can vary depending on the exact implementation of the eviction handler. For example, if the eviction handler 280 comprises executable instructions executing as part of the operating system 134, or if the eviction handler 280 comprises at least one intermediate storage-centric device 250, the eviction handler can, at step 420, query one or more of the storage devices 149 for their eviction capabilities. Alternatively, the eviction handler 280 could reference a database or other information store that can comprise information regarding the particular storage devices 149, including, for example, what eviction capabilities those specific storage devices support. In another embodiment, if the eviction handler 280 comprises storage device control circuitry 260 of at least some of the storage devices 149, the eviction capabilities may already be hard-coded as part of the storage devices control circuitry and, thus, at step 420, the eviction handler 280 could already be aware of such capability.

After obtaining the storage hardware's eviction capabilities at step 420, the eviction handler 280 can wait for information to be received that can act as a trigger for performing an eviction. Thus, as shown in the flow diagram 400, at step 430, a determination can be made if an eviction trigger has been received. If no eviction trigger has yet been received, processing can loop back to step 430, thereby waiting for a trigger.

As described above, information that can trigger an eviction can comprise information regarding the status of the storage media, such as information that the storage media is experiencing errors indicative of an upcoming failure, or information that the storage media needs to be wear leveled or that the data stored on the storage media needs to be defragmented. Alternatively, as also described above, information that can trigger an eviction can comprise policy information, such as information specifying a preference for, for example, noise reduction or reduced power consumption or increased performance, or the information can comprise indicators, such as an indicator of data that is requested to be pre-fetched, or data that is indicated as being high priority or data that is indicated as being merely temporary. If any of such information is received at step 430, a subsequent determination can be made at step 440 based on the ability, as indicated in response to the query of step 420, of the underlying storage devices to perform an eviction. If, as determined at step 440, such storage devices are capable of performing an eviction, the eviction handler 280 can, at step 450, send an eviction command, specifying the starting address of the data to be evicted and a range of that data, and also specifying a destination for such data. If, as determined at step 440, the storage device from which the data is to be evicted does not support eviction, more detailed commands can be provided, as will be described further below with reference to the flow diagram 500 of FIG. 5.

In either case, as shown in the flow diagram 400, a determination can be made at step 460, after the eviction, to determine if any errors occurred. As indicated previously, the presence of such errors, or other information relevant to the eviction, can be provided as part of the feedback from the storage device to the eviction handler 480. If, at step 460, it is determined that errors did occur, an appropriate response, such as notifying the user, can be performed at step 470. Such user notifications of step 470 can include indications, to the user, of the error, and the likely significance of the error, such as, for example, that one or more of the user's storage devices may be failing, or that various operations cannot be performed. If, at step 460, no errors are detected, processing can return to step 430 to await another eviction trigger.

Figure 5:
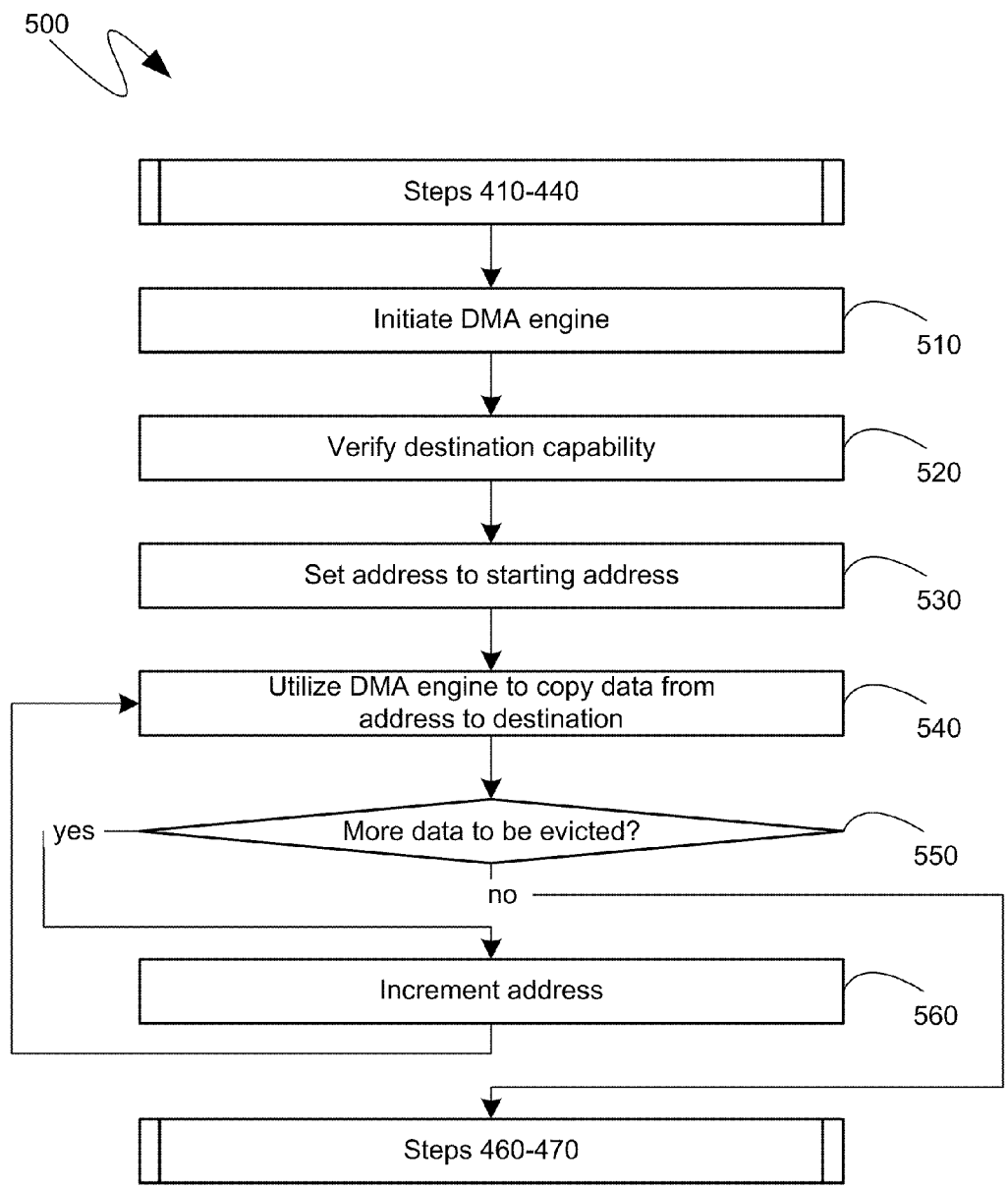
FIG. 5 is a flow diagram of a portion of an exemplary eviction.

Turning to FIG. 5, the flow diagram 500 illustrates an exemplary series of steps that can be performed, such as by the eviction handler 280, if the underlying storage device does not support a higher-level eviction command. Thus, as shown in the flow diagram 400 of FIG. 4, if, at step 440, it is determined that the storage device does not comprise eviction capability, processing can proceed to step 510 where, as shown in FIG. 5, the eviction handler 280 can initiate components to aid in the eviction, such as a Direct Memory Access (DMA) engine, or similar existing component, or a customized component comprising instructions for performing the steps of flow diagram 500.

Subsequently, after initiating a DMA engine, or similar process, at step 510, the eviction handler 280 can, at step 520 verify that the destination storage medium on the destination storage device can accept the data being evicted. Once the destination's capability is verified at step 520, the eviction handler 280 can set the current address to the starting address of the data to be evicted at step 530 and can then utilize the DMA engine initiated at step 510 to copy the data from the current address to the specified destination at step 540. As will be known by those skilled in the art, the DMA engine can be utilized at step 540 to both read the data from the range of addresses of the source storage medium and then write the data at the range of addresses selected at the destination storage medium. At step 550 a check can be made to determine if additional data remains to be evicted. If it does, processing can proceed to step 560, and the current address can be incremented prior to looping back to step 540 and copying the data from the newly incremented current address to the destination. Once no additional data remains to be evicted, as determined at step 550, the relevant processing of the flow diagram 500 can end and processing can return to the flow diagram 400, specifically to step 460, as described above. In such an exemplary manner, the eviction handler 280, or similar mechanism, can provide for greater control over an eviction operation if the underlying storage device does not comprise built-in eviction capability.

As can be seen from the above descriptions, mechanisms for determining an eviction of data from one storage media to a device with another storage media have been provided to enable more efficient use of a storage system having heterogeneous storage media types. In view of the many possible variations of the subject matter described herein, we claim as our invention all such embodiments as may come within the scope of the following claims and equivalents thereto.

We claim:

1. One or more computer-readable media comprising computer-executable instructions for optimizing utilization of heterogeneous computer-readable storage media, the computer-executable instructions directed to steps comprising:

receiving one or more eviction triggers, each individually specifying at least one of: a pre-fetch indicator, a requested performance threshold, a power consumption setting, a prioritization of associated data, a temporary nature of associated data, and an indicator of anticipated repeated utilization of associated data;

identifying a first type of computer-readable storage media having inherent characterstics such that it is more advantageous, with respects to at least some of the eviction triggers, to have data associated with those eviction triggers stored on the first type of computer-readable storage media as opposed to on a second, different, type of computer-readable storage media, herein computer-readable storage media of both the first type and the second type are part of the heterogeneous computer-readable storage media;

determining, based on the at least one of the received eviction triggers and the identified first type of computer-readable storage media, to evict a pre-defined first set of data from a first computer-readable storage medium of the heterogeneous computer-readable storage media to a second computer-readable storage medium of the heterogeneous computer-readable storage media, the pre-defined first set of data comprising only a portion of data stored on the first computer-readable storage medium, wherein the first computer-readable storage medium is of the second type and the second computer-readable storage medium is of the first type; and evicting the pre-defined first set of data from the first computer-readable storage medium to the second computer-readable storage medium.

2. The computer-readable media of claim 1, comprising further computer-executable instructions for performing wear leveling on the first computer-readable storage medium after the evicting and returning the pre-defined first set of data to the first computer-readable storage medium after the wear leveling.

3. The computer-readable media of claim 1, comprising further computer-executable instructions for evicting a second set of data from the second computer-readable storage medium to another computer-readable storage medium of the heterogeneous computer-readable storage media, prior to the evicting of the pre-defined first set data from the first computer-readable storage medium to the second computer-readable storage medium, in order to generate sufficient storage capacity, on the second computer-readable storage medium, to accommodate the pre-defined first set of data, wherein the pre-fetch indicator indicated that the pre-defined first set of data was to be pre-fetched.

4. The computer-readable media of claim 1, comprising further computer-executable instructions for placing the first storage device into an inactive state, after the evicting, in furtherance of the power consumption setting.

5. A method for optimizing utilization of heterogeneous computer-readable storage media comprising the steps of:

receiving one or more eviction triggers, each individually specifying at least one of: a pre-fetch indicator, a requested performance threshold, a power consumption setting, a prioritization of associated data, a temporary nature of associated data, and an indicator of anticipated repeated utilization of associate data;

identifying a first type of computer-readable storage media having inherent characteristics such that it is more advantageous, with respect to at least some of the eviction triggers, to have data associated with those eviction triggers stored on the first type of computer-readable storage media as opposed to on a second, different, type of computer-readable storage media, wherein computer-readable storage media of both the first type and the second type are part of the heterogenous computer-readable storage media;

determining, based on the at least one of the received eviction triggers and the identified first type of computer-readable storage media, to evict a pre-defined first set of data from a first computer-readable storage medium of the heterogeneous computer-readable storage media to a second computer-readable storage medium of the heterogeneous computer-readable storage media, the pre-defined first set of data comprising only a portion of the data stored on the first computer-readable storage medium, wherein the first computer-readable storage medium is of the second type and the second computer-readable storage medium is of the first type; and evicting the pre-defined first set of data from the first computer-readable storage medium to the second computer-readable storage medium.

6. The method of claim 5, further comprising the step of performing wear leveling on the first computer-readable storage medium after the evicting and returning the pre-defined first set of data to the first computer-readable storage medium after the wear leveling.

7. The method of claim 5, further comprising the step of evicting a second set of data from the second computer-readable storage medium to another computer-readable storage medium of the heterogeneous computer-readable storage media, prior to the evicting of the pre-defined first set of data the first computer-readable storage medium to the second computer-readable storage medium, in order to generate sufficient storage capacity, on the second computer-readable storage medium, to accommodate the pre-defined first set of data, wherein the pre-fetch indicator indicated that the pre-defined first set of data was to be pre-fetched.

8. The method of claim 5, further comprising the steps of:
placing the first storage device into an inactive state, after the evicting, in furtherance of the power consumption setting.

9. A storage device comprising heterogeneous computer-readable storage media and control circuitry, the control circuitry performing steps comprising:

receiving one or more eviction triggers, each individually specifying at least one of: a pre-fetch indicator, a requested performance threshold, a power consumption setting, a prioritization of associated data, a temporary nature of associated data, and an indicator of anticipated repeated utilization of associated data;

identifying a first type of computer-readable storage media having inherent characteristics such that it is more advantageous, with respect to at least some of the eviction triggers, to have data associated with those eviction triggers stored on the first type of computer-readable storage media as opposed to on a second, different, type of computer-readable storage media, wherein computer-readable storage media of both the first type and the second type are part of the heterogeneous computer-readable storage media;

determining, based on at the least one of the received eviction triggers and the identified first type of computer-readable storage media, to evict a pre-defined first set of data from a first computer-readable storage medium of the heterogeneous computer-readable media to a second computer-readable storage medium of the heterogeneous computer-readable storage media, the pre-defined first set of data comprising only a portion of data stored on the first computer-readable storage medium, wherein the first computer-readable storage medium is of the second type and the second computer-readable storage medium is of the first type; and evicting the pre-defined first set of data from the first computer-readable storage medium to the second computer-readable storage medium.

10. The storage device of claim 9, wherein the control circuitry performs further steps comprising monitoring the heterogeneous computer-readable storage media; and generating, based on the monitoring, at least one of the one or more eviction triggers.

11. The storage device of claim 9, wherein the control circuitry performs further steps comprising performing wear leveling on the first computer-readable storage medium after the evicting and returning the pre-defined first set of data to the first computer-readable storage medium after the wear leveling.

12. The storage device of claim 9, wherein the control circuitry performs further steps comprising evicting a second set of data from the second computer-readable storage medium to another computer-readable storage medium of the heterogeneous computer-readable storage media, prior to the evicting of the pre fined first set of data from the first computer-readable storage medium to the second computer-readable storage medium, in order to generate sufficient storage capacity, on the second computer-readable storage medium, to accommodate the pre-defined first set of data, wherein the pre-fetch indicator indicate that the pre-defined first set of data was to be pre-fetched.

13. The storage device of claim 9, wherein the control circuitry performs further steps comprising placing the first storage device into an inactive state, after the evicting, in furtherance of the power consumption setting.

14. The computer-readable media of claim 1, wherein the first type of computer-readable storage media is solid-state computer-readable storage media and the second type of computer-readable storage media is magnetic computer-readable storage media.

15. The computer-readable media of claim 1, wherein at least some of the received one or more eviction triggers are received from an application program utilizing data that is associated with the at least some of the received eviction triggers, the application program executing on a computing device that is communicationally coupled to the heterogeneous computer-readable storage media.

16. The computer-readable media of claim 1, wherein the inherent characteristics comprise data read and write efficiency characteristics, power consumption characteristics and storage capacity characteristics.

17. The method of claim 5, wherein the first type of computer-readable storage media is solid-state computer-readable storage media and the second type of computer-readable storage media is magnetic computer-readable storage media.

18. The method of claim 5, wherein at least some of the received one or more eviction triggers are received from an application program utilizing data that is associated with the at least some of the received eviction triggers, the application program executing on a computing device that is communicationally coupled to the heterogeneous computer-readable storage media.

19. The method of claim 5, wherein the inherent characteristics comprise data read and write efficiency characteristics, power consumption characteristics and storage capacity characteristics.

20. The storage device of claim 9, wherein the first type of computer-readable storage media is solid-state computer-readable storage media and the second type of computer-readable storage media is magnetic computer-readable storage media.

* * * * *